| United States Patent [19] | [11] Patent Number: 4,749,506 |
| --- | --- |
| Kitahara et al. | [45] Date of Patent: Jun. 7, 1988 |

[54] FINE PARTICLE SUBSTANCE-CONTAINING MICROGEL DISPERSIONS

[75] Inventors: Ayao Kitahara, Narashino; Kijiro Konno, Sayama, both of Japan

[73] Assignee: Ricoh Co., Ltd., Tokyo, Japan

[21] Appl. No.: 777,892

[22] Filed: Sep. 19, 1985

[30] Foreign Application Priority Data

Sep. 29, 1984 [JP] Japan ................. 59-206108

[51] Int. Cl.$^4$ ............................................. C09D 5/23
[52] U.S. Cl. .................... 252/62.54; 523/200;
523/205; 524/110; 524/166; 524/236; 524/238;
524/301; 524/317; 524/362; 524/368; 524/375;
524/376; 524/458; 524/460; 524/714; 524/724;
524/748; 524/753; 524/760; 524/761; 524/762;
524/765; 524/767; 524/776; 524/777; 524/783;
524/785; 524/801; 524/923
[58] Field of Search .............. 252/62.54; 524/801,
524/458, 923, 460, 748, 785, 783, 714, 724, 748,
753, 761, 762, 760, 768, 767, 776, 777, 166, 110,
236, 238, 301, 317, 362, 364, 375, 376; 523/333,
205, 200

[56] References Cited

U.S. PATENT DOCUMENTS

| | | | |
| --- | --- | --- | --- |
| 3,265,644 | 8/1966 | Herman | 524/801 |
| 4,299,882 | 11/1981 | Togawa | 252/62.54 |
| 4,336,173 | 6/1982 | Ugelstad | 523/205 |
| 4,421,660 | 12/1983 | Solc nee Hajna | 252/62.54 |
| 4,438,179 | 3/1984 | Solc | 252/62.54 |
| 4,454,282 | 6/1984 | Bradshaw | 252/62.54 |
| 4,493,778 | 1/1985 | Iqbal | 252/62.54 |
| 4,609,608 | 9/1986 | Solc | 252/62.54 |
| 4,664,841 | 5/1987 | Kitahara et al. | 252/309 |

OTHER PUBLICATIONS

*Handbook of Chemistry and Physics*, 39th ed, pp. 712–715, Chemical Rubber Company, Cleveland, Ohio, 1957.

*Primary Examiner*—C. Warren Ivy
*Attorney, Agent, or Firm*—Flynn, Thiel, Boutell & Tanis

[57] ABSTRACT

A microgel dispersion characterized by that an oil-soluble surface active agent is adsorbed or adhered onto a gel consisting of a fine particle substance and a polymer, and said gel is dispersed in a non-aqueous organic solvent.

12 Claims, 1 Drawing Sheet

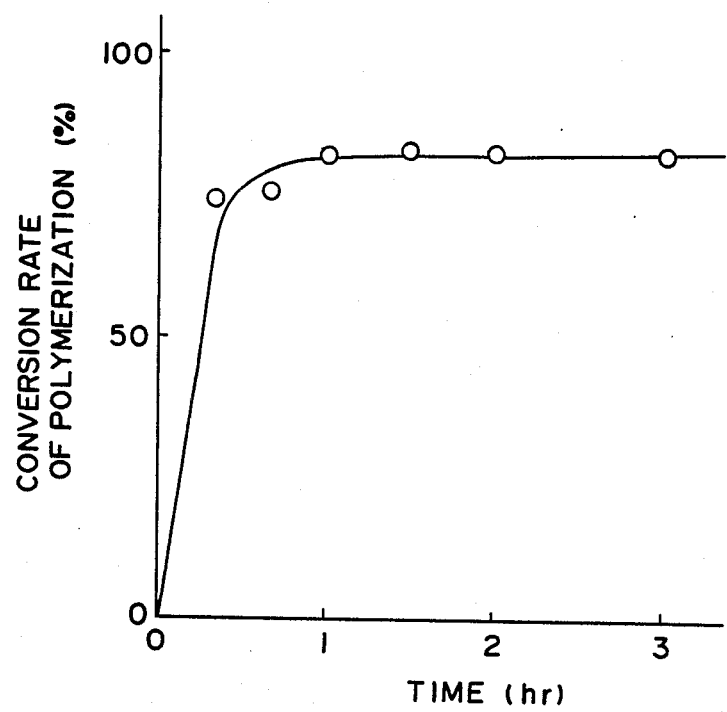

FINE PARTICLE SUBSTANCE-CONTAINING MICROGEL DISPERSIONS

BACKGROUND OF THE INVENTION

1. Field of the Invention

The present invention relates to a fine particle substance-containing non-aqueous dispersion, in particular relates to a microgel dispersion wherein a gel consisting of a fine particle substance and a polymer is dispersed in a water-insoluble organic solvent.

In this connection, it is to be noted that the "fine particle substance" referred to herein means a substance having a mean particle diameter of 1000 Å or less, especially 300 Å or less.

2. Description of the Prior Art

As the representative fine particle substance-containing non-aqueous dispersions can be enumerated: electrophotographic liquid developers obtained by coating pigment particles with a resin and dispersing same in a carrier liquid; gravure ink obtained by coating pigment particles with a resin and dispersing same in an organic solvent; and the like.

Recently, the study of a magnetic fluid has been promoted and many investigations have been carried out for developing new uses of the magnetic fluid. The magnetic fluid referred to herein means a liquid high-magnetic fluid obtained by dispersing a super fine particle magnetic substance having a particle diameter of about 1000 Å or less, preferably about 300 Å or less, more preferably about 30–50 Å stably in a solvent, said substance being provided with both fluid and high-magnetic characteristics.

Production of this magnetic fluid using the conventional process, however, involves problems to be solved such as (i) the production cost is high, (ii) the products have great, from lot to lot, differences with respect to dispersed particle diameter, dispersion stability, viscosity and magnetic characteristics, and further (iii) the dispersion stability per se is not necessarily good.

The reasons for the above (i) and (ii) seem to be attributable the fact that many manufacturing steps are used and control of each step is complicated and difficult. In addition, as the reason for the above (iii) can be enumerated the fact that the step (a) or (b) of the conventional process employed for dispersing high-magnetic oxide particles in the water-insoluble organic solvent is defective. In more detail, in the step (a), which comprises flushing the high-magnetic oxide particles obtained by the wet process in the water-insoluble organic solvent, there is required a proper solid-liquid separating operation before flushing in the case of preparing a dispersion wherein the high-magnetic oxide particle is especially a super fine one having a particle diameter of 300 Å or less, and further the filtering separation or centrifugal separation employed herein is itself considerably inferior in efficiency. Consequently, the step (a) further necessitates a treating step for improving the separation efficiency which in turn deteriorates the dispersion stability. In the step (b) which comprises grinding the high-magnetic oxide particles obtained by the wet process in the water-insoluble organic solvent, on the other hand, said grinding is effected by means of a ball mill, attriter or the like, but this grinding efficiency is extremely inferior, whereby a long period of time such as several weeks is required for treating and additionally it is very difficult to reduce the dispersion phase into a particle diameter of 1000 Å or less, especially 300 Å or less. In addition, the step (b) is defective in that it is not adapted for the mass production of the magnetic fluid on an industrial scale.

For the purpose of eliminating these defects inherent in the usual processes, novel processes for the production of magnetic fluid have been proposed; namely a process (c) (disclosed in Japanese Laid Open Patent Application No. 65182/1979) which comprises adding alkali to an aqueous solution containing ferrous salt and ferric salt to thereby adjust the pH and form colloidal particles; then adding a specific amount of unsaturated fatty acid salt to said particles to thereby coat the colloidal particles with a mono-molecular film of unsaturated fatty acid; thereafter adding a water-insoluble organic solvent thereto for layer-separating; and recovering a magnetic fluid as an organic layer; a process (d) (disclosed in Japanese Laid Open Patent Application No. 13995/1976) which comprises dispersing iron oxide in water to assume a colloidal state; adding a water-insoluble fatty acid to said dispersion while stirring vigorously to obtain a fatty acid—adsorbed iron oxide; and dispersing said iron oxide in a water-insoluble solvent for preparing a magnetic fluid; and the like.

However, the fact is that since these processes (c) and (d) employ various steps, the problems of production cost, dispersion stability and the like are not solved. Furthermore, since this dispersion stability is not necessarily superior, the dispersoid dispersed in the water-insoluble organic solvent comes to form an aggregate immediately after the preparation as well as by the lapse of time and influences from temperatures. To sum up, the above proposed processes may be said to be disadvantageous in that they can not produce the dispersoid in the very fine particle form as intended by the inventors of the present invention.

SUMMARY OF THE INVENTION

It is an object of the present invention to provide a fine particle substance-containing microgel dispersion which is capable of eliminating the above mentioned defects or disadvantages. It is another object of the present invention to provide a microgel dispersion containing said dispersoid, which average particle diameter is mainly in the range of 1000 Å or less, especially 300–400 Å. It is still another object of the present invention to provide a fine particle substance-containing microgel dispersion which can be produced by simple manufacturing steps and accordingly at a reduced cost and further can be mass produced on an industrial scale.

The fine particle substance-containing microgel dispersion according to the present invention is characterized by the fact that said dispersion is prepared by mixing a water-soluble monomer dispersed in a W/O type microemulsion with a fine particle dispersion in which the fine particle substance having adsorbed or adhered thereon an oil-soluble surface active agent is dispersed in a water-insoluble organic solvent; and thus polymerizing said monomer.

BRIEF DESCRIPTION OF THE DRAWING

The drawing is a graph showing the relationship between the conversion rate of polymerization and changes after the lapse of time in preparing the magnetic microgel.

DETAILED DESCRIPTION OF THE PREFERRED EMBODIMENTS OF THE INVENTION

A W/O type microemulsion comprising three components, namely a surface active agent/water/a non-aqueous organic solvent, in particular a hydrocarbon liquid, is a solution which is a high aqueous dispersion, has a very wide water/oil interface and is stable thermodynamically.

A fine particle substance-containing microgel dispersion is obtained by polymerizing a water-soluble monomer under the presence of a crosslinking agent and a fine particle substance such as magnetite by the use of said W/O type microemulsion comprising a surface active agent/water/a non-aqueous organic solvent, in particular a hydrocarbon liquid, according to the present invention.

As the fine particle substance, there can be enumerated (a) magnetic particles such as nickel, cobalt, ferrite as well as magnetite; (b) pigment particles such as titanium oxide, barium sulfate, calcium carbonate and magnesium carbonate; (c) particles of a latex type high molecular substance such, for instance, as polyacrylamide, polyacrylic acid or its salt; and (d) dye particles. Of course, the above mentioned fine particle substances are merely some of the exemplary ones. The microgel dispersions comprising two or more of the same or different kinds of fine particle substances naturally are within the scope of the present invention.

The typical surface active agents (oil-soluble surface active agents) used in the present invention include those having the following general formula:

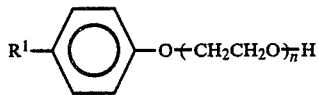
(1)

(wherein, $R^1$ represents an alkyl group containing 1-20, preferably 6-20 carbon atoms, in particular preferably an unsaturated or side-chain alkyl group. n is an integer of 1-20, preferably 6-10.), $$R^1O(CH_2CH_2O)_{n'}H \quad (2)$$

(wherein, $R^1$ is the same as defined in the general formula (1). n' is an integer of 1-20, preferably 4-10.),

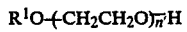
(3)

(wherein, $R^2$ represents an alkyl group containing 8-20 carbon atoms, preferably an unsaturated or side-chain alkyl group.), $$R^3CO(CH_2CH_2O)_{n}OH \quad (4)$$

(wherein, $R^3$ represents an alkyl group containing 4-20, preferably 8-18 carbon atoms, in particular preferably an unsaturated or side-chain alkyl group. n is the same as defined in the general formula (1).),

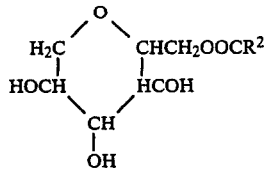
(5)

(wherein, $R^2$ is the same as defined in the general formula (3).),

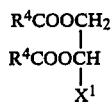
(6)

(wherein, $R^4$ represents an alkyl group containing 1-30, preferably 4-8 carbon atoms, in particular preferably an unsaturated or side-chain alkyl group. And, $X^1$ represents $SO_3Na$, $OSO_3Na$, $COONa$, $SO_3K$, $SO_4K$ or $COOK$.),

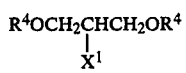
(7)

(wherein, $R^4$ and $X^1$ are the same as defined in the general formula (6).),

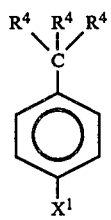
(8)

(wherein, $R^4$ and $X^1$ are the same as defined in the general formula (6).),

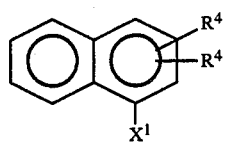
(9)

(wherein, $R^4$ and $X^1$ are the same as defined in the general formula (6).), $$R^5N^+H_3O^-OCR^6 \quad (10)$$

(wherein, $R^5$ represents an alkyl group containing 8-20 carbon atoms, $R^6$ represents an alkyl group containing 1-8 carbon atoms, and both may be an unsaturated alkyl group and a side-chain alkyl group.), and

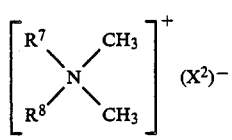
(11)

(wherein, $R^7$ represents an alkyl group containing 3-18 carbon atoms, $R^8$ represents an alkyl group containing 10-18 carbon atoms, and both may be an unsaturated alkyl group and a side chain alkyl group. $X^2$ represents a halogen ion.).

These active agents (including similar compounds) may be used singly or two or more kinds of said agents may be used concurrently. However, it is most effective to use alkylammonium carboxylate, a sodium dioctyl sulfosuccinate, hereinafter called Aerosol OT[AOT], at the time of producing a microgel at the final stage.

As the non-aqueous organic solvents used in the present invention, there can be enumerated petroleum hydrocarbons such as kerosine and Isopar H (a product of ESSO Standard Oil Co. consisting of 99.8 vol. % of paraffins and 0.2 vol. % of aromatics and having a specific gravity of 0.757 at 60° F.); other hydrocarbons such as hexane, octane, cyclopentane, benzene, toluene and Xylene; halogenated hydrocarbons such as carbon tetrachloride, trichloroethylene, tetrachloroethane and dichlorobenzene; ethers such as diethyl ether and isopropyl ether; esters such as ethylacetate, propylacetate and phenylacetate; and alcohols such as octyl alcohol, nonyl alcohol, decyl alcohol and benzyl alcohol. Among them, cyclohexane is used most effectively. These solvents may be used singly or two or more kinds of said solvents may be used concurrently.

In the preparation of the microgel dispersion according to the present invention, it is profitable to obtain a stable fine particle substance-containing dispersion beforehand. For instance, when the fine particle substance is magnetite, said dispersion can be prepared by adding at least the ferrous salt, ferric salt and alkali aqueous solutions to the oil solution of the surface active agent. In more concrete, the high magnetic oxide fine particle substance is produced by co-precipitating at least a three component system comprising the ferrous salt, ferric salt and alkali aqueous solutions in the water pool within the inverse-micelle formed in the non-aqueous solution of oil-soluble surface active agent or in water drops of the W/O type microemulsion or W/O type emulsion. This fine particle had adsorbed or adhered the oil-soluble surface active agent thereon and takes the form of having been dispersed in the non-aqueous solution (water-insoluble organic solvent). As the salts of ferrous salt and ferric salt used herein can be enumerated sulfate, hydrochloride, nitrate and the like.

The ratio of the ferrous salt to the ferric salt is preferable to be in the range of at least 8 or more in terms of molar ratio. The quantity of alkali added is preferable to be equivalent or substantially equivalent to iron salts in order to prevent the by-product of the alkaline salt of the surface active agent to the utmost. Said magnetite fine particles can be prepared with gentle stirring.

In the above mentioned case, there may be employed the step (a) which comprises adding the ferrous salt and ferric salt aqueous solution to the oil solution of the surface active agent and then adding the alkali aqueous solution thereto, thereby forming the high magnetic oxide (magnetite) precipitates by virtue of the reaction between those aqueous solutions. In addition thereto, there may be employed the following steps such as the step (b) which comprises mixing the ferrous salt with the ferric salt, dissolving this mixture in water, adding this solution to the oil solution of the surface active agent and further adding the alkali aqueous solution thereto; the step (c) which comprises solubilizing the alkali aqueous solution in the oil solution of the surface active agent, adding thereto the ferrous salt aqueous solution (or the ferric salt aqueous solution) and the ferric salt aqueous solution (or the ferrous salt aqueous solution) in sequence; the step (d) which comprises mixing a solution obtained by solubilizing the ferrous salt aqueous solution (or the ferric salt aqueous solution) in the oil solution of the surface active agent with a solution obtained by solubilizing the ferric salt aqueous solution (or the ferrous salt aqueous solution) in the same or different oil solution of the surface active agent to thereby form a mixed solution, separately preparing a solution by solubilizing the alkali aqueous solution in the same or different oil solution of the surface active agent, and adding this solution to the above mentioned mixed solution; and the step (e) which comprises solubilizing each of the ferrous salt (or ferric salt) and alkali aqueous solutions in the separate oil solution of the surface active agent, mixing the thus obtained solutions and adding the ferric salt (or ferrous salt) aqueous solution to the above mixed solution.

By using these steps (b) to (e), there can be formed magnetite precipitates due to the reaction between the aqueous solutions of ferrous and ferric salts and the alkali. Preferably, attention should be paid to the kind and quantity of alkali beforehand so that the co-precipitation reaction in these production courses of magnetite may be carried out at pH of 9.0 or more.

The desirable quantity of alkali is as described previously, and as the desirable kinds of alkali can be enumerated the aqueous solutions of ammonium hydroxide, sodium hydroxide, potassium hydroxide, sodium carbonate, sodium sulfite and the like.

The thus obtained high magnetic oxide fine particle dispersion contains an electrolyte such as alkali or the like, said electrolyte exerting a bad influence upon the microgelation reaction at the time of magnetic microgel preparation and its stability. Accordingly, this magnetite dispersion is washed (purified) with a mixture of an organic solvent which does not form an emulsion (such, for instance, as benzene, toluene or the like) and water.

The purified dispersion (magnetic fluid), namely the magnetite dispersion, is in such a state that an oil soluble surface active agent has been adsorbed or adhered on the magnetite, and same has been dispersed in the water insoluble organic solvent.

In place of said magnetite, the present invention may employ other magnetic particles, pigment particles, dye particles, high polymer substance particles and the like. In this case, the aforesaid process for the production of magnetic fluid may also be carried out as it stands or in the manner of varying a part of the process properly.

For instance, when the fine particle substance is comprised of a high molecular substance, there may be cited one applicable process which comprises dissolving a monomer in water, adding this to the oil solution of a surface active agent and adding a polymerization initiator thereto with stirring. And, when the fine particle substance is comprised of a titanium compound, there may be cited one process which comprises hydrolyzing tetraalkyltitanate or titanium tetrachloride in the inverse-micelle formed in the non-aqueous solution of oil-soluble surface active agent or in water drops of the W/O type microemulsion or W/O type emulsion. In this instance, it is also profitable that the molar ratio of water to said tetraalkyltitanate or titanium tetrachloride should be maintained at 2 or more.

In the processes for the production of fine particle dispersions explained up to now, it is desirable that the non-aqueous solution of the oil-soluble surface active agent should have a concentration (namely, the concentration of the oil-soluble surface active agent) more than the Critical Micelle Concentration (CMC) of the surface active agent used therein.

On the other hand, there is prepared a water-soluble monomer dispersed in the W/O type microemulsion. In more concrete, predetermined quantities of water-soluble monomer (for instance: acrylamide) and crosslinking agent [N,N'-methylenebisacrylamide (MBAAm)] are added to an Aerosol OT/cyclohexane solution into which nitrogen has been blown sufficiently, and same is stirred and mingled, thereby obtaining a solubilized monomer (a solubilized monomer system). The water-soluble monomers may include acrylic acid, methyl vinyl ketone, N-vinyl-2-pyrrolidone and the like besides acrylamide.

The concentration of monomer in this system is about 3-15 wt%, preferably about 5-10 wt%. The quantity of crosslinking agent compounded is properly in the range of about 1-15 parts by weight per 100 parts by weight of said monomer.

Thereafter, a predetermined quantity (wherein, the percentage by weight of the fine particle substance occupying the total quantity of the solubilized solution and the fine particle dispersion is 0.05-5 wt%, preferably 0.1-1.0 wt%) of the previously prepared fine particle substance dispersion is added to this solubilized liquid (solubilized monomer system), and same is mixed at a heated temperature (30-100, preferably about 60° C.) for a fixed time (for instance, one hour). In succession, an aqueous potassium persulfate ($K_2S_2O_8$) solution is added to this mixed solution and same is subjected to polymerization reaction at the same heated temperature for a predetermined time, thereby preparing a fine particle substance-containing microgel dispersion.

In this connection, it is to be noted that the "potassium persulfate" referred to herein is used as a polymerization accelerator.

The accompanying drawing shows changes in the conversion rate of polymerization after the lapse of time under the conditions that the cross-linking agent concentration (the weight ratio of MBAAm to acrylamide) is 3%; the molar ratio (R) of water to AOT is given; and the magnetite particle concentration is 0.226 wt%, in the preparation of said magnetic microgel. It can be seen therefrom that the polymerization reaction progresses with the start of reaction, and about 80% or more polymerization is completed for 40 minutes.

A large quantity of acetone was added to the reaction solution immediately after the completion of reaction, the obtained polyacrylamide was washed sufficiently with acetone and dried, and thereafter same was measured in respect of the conversion ratio of polymerization by the weight method.

The thus prepared magnetic microgel dispersion is very stable, and this magnetic microgel takes the form of fine particles consisting essentially of those having a particle diameter of 300-400 Å. It is as stated previously that pigment particles, high molecular substance particles and the like may be employed in place of magnetite. In those cases, there are prepared microgel dispersions containing fine particle substances with stability corresponding thereto.

In the thus prepared fine particle substance-containing microgel dispersion according to the present invention, the fine particle substance such as magnetite and the polymer form a gel, the hydrophilic group side of the oil-soluble surface active agent adheres to or is adsorbed on this gel rigidly, and same is dispersed in the water insoluble organic solvent.

The microgel of the present invention per se is water-insoluble, and so may be dispersed in both aqueous and oily solvents. Accordingly, it is possible for the present invention to exchange the dispersion medium from the water-insoluble organic solvent to the water-soluble organic solvent or water medium afterwards if necessary. Further, it is possible for the present invention to take out the microgel from the microgel dispersion, and polymerize same completely to thereby obtain a fine particle substance covered completely with a polymer.

The microgel dispersion according to the present invention is considered to have a variety of uses. For instance, when the fine particle substance is a magnetic substance, there can be enumerated the uses such as magnetic ink, magnetic paint, sealing agent, medical materials, oil absorbent, separating/recovering agent for non-magnetic metals, fuel control agent and the like. When the fine particle substance is pigment or dye, there can be enumerated the uses such as printing ink, coloring agent for rubber and plastics, and the like. When the fine particle substance is a high molecular substance, it is applicable to the purposes such as coating agent for plastics, glass and the like, paint, printing ink and the like.

And, when the microgel dispersion of the present invention is used as a surface coating agent for plastics and rubber, it is necessary to add a binder thereto or coat the dispersoid with a resin before use. When using the microgel dispersion of the present invention as printing ink, paint or jet ink for use in the electrostatic recording method, it is necessary to add a viscosity control agent thereto before use. Further, applying this microgel dispersion to a wet toner for use in electrophotography (including the electrostatic recording method), it is necessary to add thereto proper quantities of binder and polarity control agent before use. And, when spraying this wet toner and drying, there can be obtained one-component type dry toner.

The fine particle substance-containing microgel dispersion of the present invention is extremely stable. Up to now, it has been considered difficult to obtain a microgel of about 1000 Å. According to the present invention, contrarily, it is easy to obtain a microgel which has an average particle diameter mainly in the range of 300-400 Å and is stable. Further, as the microgel of the present invention is water-insoluble, it is possible to except the enlarged application field of the dispersion according to the present invention.

EXAMPLES

Every % referred to herein is wt%.

EXAMPLE 1

A black magnetic fluid with a stable dispersibility was obtained by adding an aqueous solution of ferric chloride and ferrous chloride to an isooctane solution of di(2-ethylhexyl)sodium sulfosuccinate [AOT] while stirring, and further adding 15N-NH$_4$OH and mixed together, the molar ratio of ferric chloride to ferrous chloride to NH$_4$OH being 1:8:86. The particle diameter of magnetite in this magnetic fluid is 30-50 Å. This was washed (purified) with a benzene/water mixed solvent to thereby prepare a magnetite dispersion (A solution).

Separately, a monomer solubilized solution (B solution) was prepared in the manner of adding acrylamide and an aqueous MBAAm solution to a solution of AOT/cyclohexane in which a sufficient quantity of nitrogen gas had been blown, and mixing and stirring same for solubilization.

The thus obtained B solution and A solution were mixed together and this mixture was held at 60° C. for 1 hour. Thereafter, an aqueous $K_2S_2O_8$ solution was added thereto and subjected to rotary-mixing, thereby preparing a magnetic microgel dispersion. Preparation was carried out under the conditions: R=15, MBAAm concentration 3%, and magnetite particle concentration 0.45%. In this connection, it is to be noted that "R" stands for a molar ratio of water to AOT.

In the thus obtained microgel dispersion, it was found that the percentage of iron oxide contained in the magnetic microgel was 3.8 and the particle diameter of the magnetic microgel was 338±74 Å. This magnetic microgel dispersion was stable even when left standing for a long period of time. The percentage of iron oxide contained was calculated by the oxidation-reduction titration method, and the particle diameter was calculated from observation using an electron microscope.

EXAMPLES 2-9

Magnetic microgel dispersions were prepared according to the exactly same procedure as Example 1 except that the concentration of MBAAm was fixed to be 3%, and the concentration of magnetite and the molar ratio (R) of water to AOT were changed variously.

These dispersions were of good quality. The percentages of iron oxide contained in those respective microgels and the particle diameters thereof were as shown in Table-1.

TABLE 1

| Example | $Fe_3O_4$ (%) | R | Percentage of iron oxide contained (%) | Particle diameter (Å) |
| --- | --- | --- | --- | --- |
| 2 | 0.090 | 15 | 6.5 | 327 ± 70 |
| 3 | 0.136 | 15 | 9.8 | 337 ± 62 |
| 4 | 0.181 | 15 | 14.8 | 349 ± 84 |
| 5 | 0.226 | 15 | 16.5 | 355 ± 83 |
| 6 | 0.272 | 15 | 21.1 | 344 ± 82 |
| 7 | 0.226 | 20 | 14.8 | 389 ± 134 |
| 8 | 0.226 | 25 | 16.3 | 416 ± 121 |
| 9 | 0.226 | 30 | 15.8 | 466 ± 198 |

EXAMPLE 10

Water was added to a 0.3 mole isooctane solution of AOT, and same was solubilized. This solution was named solution I. In this solution, the concentration of water was defined to be 10.0 mole. Separately, a solution of 0.24 mole n-butyl orthotitanate monomer and a 0.3 mole isooctane solution of AOT were mixed together. This mixed solution was named solution II. The solution II is free from water.

The solutions I and II were mixed and stirred, and thereafter this mixed solution was left standing for 8 hours. In succession, this solution was circulated for 5 hours to produce $TiO_2$. This solution was further distilled for removal of butanol and water. Isooctane was added to said solution in the quantity equivalents to that of isooctane reduced, and same was subjected to ultrasonic dispersion for 30 minutes to thereby prepare a $TiO_2$ dispersion.

Then, a $TiO_2$ microgel dispersion was prepared according to the same procedure as Example 1 except that this $TiO_2$ dispersion was employed in place of the magnetite dispersion and mixed with the solubilized monomer system.

EXAMPLE 11

0.3 mole of water was solubilized in a 0.3 mole isooctane solution of AOT. Separately, 0.24 mole n-butyl orthotitanate monomer was dissolved in a 0.3 mole isooctane solution of AOT. Thus prepared both solutions were mixed and stirred. Thereafter, this mixed solution was left standing for a whole day and night. Then, this solution was subjected to reflux, and the butanol and water produced by hydrolysis were distilled. Thereafter, a proper quantity of isooctane was added to the remaining solution, and same was subjected to 3 hours' ultrasonic wave radiation, thereby obtaining a resin dispersion.

In succession, a resin microgel dispersion was prepared according to the same procedure as Example 1 except that this monomer dispersion was employed in place of the magnetite dispersion and mixed with the solubilized monomer system.

We claim:

1. A composition which is a first dispersion of first, water-insoluble, microgel particles, as the dispersed phase, dispersed in a substantially water-in-soluble organic solvent, as the continuous phase;

said first, water-insoluble, microgel particles having an average particle diameter of 1000 Å or less and consisting essentially of a gel of second fine particles of a solid substance distributed in a cross-linked first polymer, said substance being different from said cross-linked first polymer, said second fine particles of said solid substance being smaller than said first, water-insoluble, microgel particles;

said composition having been prepared by mixing (1) a second dispersion of said second fine particles of said solid substance, as the dispersed phase, dispersed in a first solution of an oil-soluble surface active agent in said substantially water-insoluble organic solvent, as the continuous phase, wherein said surface active agent is adsorbed or adhered on said second fine particles of said solid substance, with (2) a monomer-solubilized system prepared by adding an aqueous solution of a water-soluble monomer capable of forming said first polymer and a cross-linking agent capable of cross-linking said first polymer to a second solution of said oil-soluble surface active agent in said substantially water-insoluble organic solvent, and forming the mixture of (1) and (2) into a W/O microemulsion;

then polymerizing and cross-linking said monomer to form said cross-linked first polymer in situ in said W/O microemulsion and thereby form said first microgel particles wherein said oil-soluble surface active agent is adhered to or adsorbed on said first, water-insoluble, microgel particles and is effective to disperse them in said substantially water-insoluble organic solvent.

2. A composition according to claim 1 wherein said first, water-insoluble, microgel particles have an average particle diameter of 300–400 Å.

3. A composition according to claim 1 wherein said substance is at least one member selected from the group consisting of magnetic particles, pigment particles, particles of a polymer different from said cross-linked first polymer and dye particles.

4. A composition according to claim 1 wherein said oil-soluble surface active agent is at least one member selected from the group consisting of those represented by the following general formulas (1)–(11)

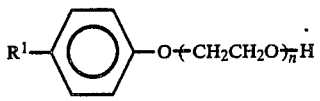 (1)

wherein $R^1$ represents an alkyl group containing 1–20 carbon atoms, and n is an integer of 1–20,

 (2)

wherein $R^1$ is the same as defined in the general formula (1), n' is an integer of 1–20,

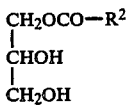 (3)

wherein $R^2$ represents an alkyl group containing 8–20 carbon atoms, $R^3CO{-}(CH_2CH_2O)_n{-}OH$ (4)

wherein $R^3$ represents an alkyl group containing 4–20 carbon atoms, and n is the same as defined in the general formula (1),

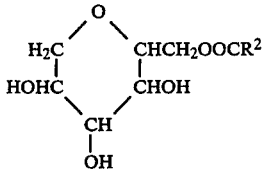 (5)

wherein $R^2$ is the same as defined in the general formula (3),

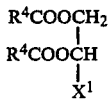 (6)

wherein $R^4$ represents an alkyl group containing 1–30 carbon atoms, and $X^1$ represents —SO$_3$Na, —OSO$_3$Na, —COONa, —SO$_3$K, —SO$_4$K or —COOK,

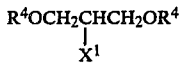 (7)

wherein $R^4$ and $X^1$ are the same as defined in the general formula (6),

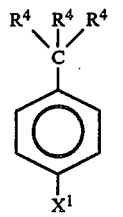 (8)

wherein $R^4$ and $X^1$ are the same as defined in the general formula (6),

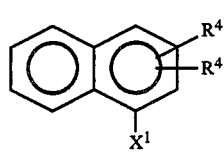 (9)

wherein $R^4$ and $X^1$ are the same as defined in the general formula (6), $R^5N^+H_3O^-OCR^6$ (10)

wherein $R^5$ represents an alkyl group containing 8–20 carbon atoms, $R^6$ represents an alkyl group containing 1–8 carbon atoms, and

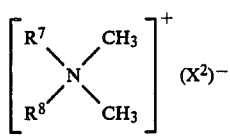 (11)

wherein $R^7$ represents an alkyl group containing 3–18 carbon atoms, $R^8$ represents an alkyl group containing 10–18 carbon atoms, and $X^2$ represents a halogen ion.

5. A composition according to claim 1, wherein said water-insoluble organic solvent is at least one member selected from the group consisting of hydrocarbons, halogenated hydrocarbons, ethers, esters and alcohols.

6. A composition according to claim 1 wherein said water-soluble monomer is at least one member selected from the group consisting of acrylamide, acrylic acid, methyl vinyl ketone and N-vinyl-2-pyrrolidone.

7. A composition according to claim 1 wherein said monomer is acrylamide, said oil-soluble surface active agent is di(2-ethylhexyl)sodium sulfosuccinate and said water-insoluble organic solvent is isooctane.

8. A composition according to claim 6 wherein said oil-soluble surface active agent has the formula

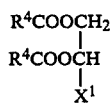

wherein $R^4$ is alkyl containing 4 to 8 carbon atoms and $X^1$ is —SO$_3$Na, —OSO$_3$Na, —COONa, —SO$_3$K, —SO$_4$K or —COOK.

9. A composition as claimed in claim 1 in which said substance is selected from the group consisting of magnetic particles, pigment particles and dye particles.

10. A composition according to claim 1, in which said monomer-solubilized system contains from about 3 to 15 percent by weight of said monomer and from 1 to 15 parts by weight of said cross-linking agent per 100 parts by weight of said monomer.

11. A composition as claimed in claim 1 in which said second dispersion has been prepared by the steps of (A) dispersing (a) the components of an aqueous reaction mixture capable of reacting to form said second fine particles and containing water therein, in (b) a liquid comprised of a solution of said oil-soluble surface active agent in said water-insoluble organic solvent, and forming a dispersed system of two immiscible liquid phases wherein the continuous phase is said liquid (b) and the dispersed phase is finely divided droplets of said aqueous reaction mixture and (B) effecting the reaction of the reactable components of said aqueous reaction mixture, in situ in said dispersed system, to transform said droplets into said second fine particles, said oil-soluble surface active agent being adhered to or adsorbed on said second fine particles.

12. A composition as claimed in claim 11 in which said particles are magnetite particles.

* * * * *